Conner & Newby,
Metal Drill,

Nº 13,383. Patented Aug. 7, 1855.

UNITED STATES PATENT OFFICE.

JAS. CONNOR AND THOS. NEWBY, OF RICHMOND, INDIANA.

MACHINE-DRILL.

Specification of Letters Patent No. 13,383, dated August 7, 1855.

*To all whom it may concern:*

Be it known that we, J. CONNER and T. NEWBY, of Richmond, in the county of Wayne and State of Indiana, have invented certain new and useful Improvements in Machine-Drills; and we do hereby declare that the following is a full, clear, and exact description of the same, reference being had to the accompanying drawings, making a part of this specification, in which—

Figure 1:
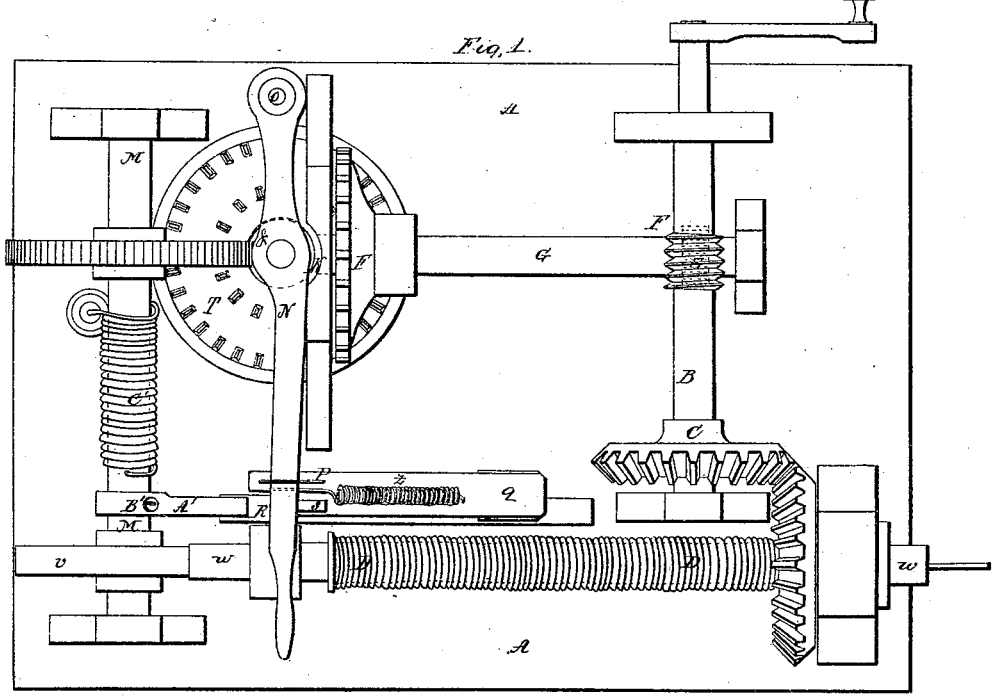
Figure 2:
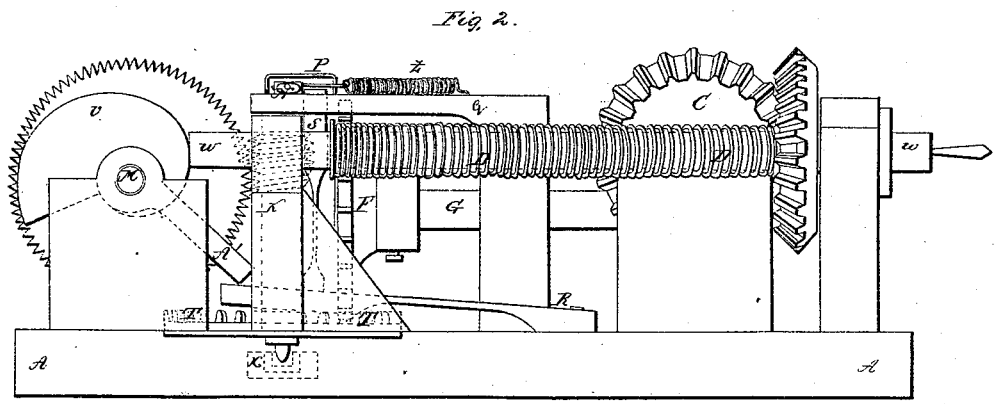

Figure 1, represents a top view of an entire metal drilling machine with our improvement applied, and Fig. 2, a side elevation of the same.

In each of these figures the same letters of reference are used to indicate like parts.

The nature of our invention consists, mainly, in the application or use of a certain arrangement of mechanism to a drilling machine, so adapted, that it shall, when properly adjusted, operate as a regulator or governor in the operation of drilling, that is to say, enable the machine to drill through any thickness of metal &c. or to any thickness in the same that may be required, without personal attention, whereby the drill is made self acting or capable of governing itself, economizing time, and hand labor.

Our machine in its general construction and operation is similar, in its parts that perform the operation of drilling, to those in common use, with the exception, that we make use of a scroll cam for moving the drill up to its work.

A, A, is the bed frame upon which the parts of the machine are placed and sustained.

B, is the main shaft, to which the motive power is applied, which is provided with a bevel pinion wheel (*c*) which meshes in one of equal size attached to the drill stock, and thus the desired rotary motion is communicated to the drill, the stock of which has a helical spring (D) the purpose of which is to ease the drill in its work and keep it in place. At the center of the said main shaft is provided a screw (E) the thread of which meshes in a pinion (F) attached to a shaft (G) and gives motion to the latter shaft which is provided with another pinion (H) which meshes in another one (I) attached to a vertical shaft (K). Said vertical shaft is provided with a screw (L) which meshes in a pinion attached to a shaft (M) and gives the desired motion to said latter shaft which is provided with the scroll cam that moves the drill to its work. Thus the desired motion or rotary speed is given to the cam shaft (M).

All the shafts above mentioned except the vertical shaft (K) are suitably adjusted on their bearings in stationary blocks attached to the bed frame, and by them and their connections a rotary movement is given to the drill stock and its drill and the cam shaft (M) suitable to perform their respective functions.

The construction and adjustment of these several parts will, by reference to the drawings, be readily understood by those skilled in the art to which drilling machines appertain, and we will now proceed to describe more particularly our improvement.

This consists or is embraced in the arrangement of mechanism for regulating or governing the action of the drill in drilling—setting it to perform a certain amount of work or when set or adjusted enabling it to perform that amount of work,—as before alluded to in the preamble—without personal attention.

We have already observed that our manner of moving the drill to its work differs from that of machines in common use in consisting in a scroll-cam which operates against the end of the drill stock. By means of this cam and the improved mechanism before alluded to we are enabled to govern the action of the drill as above alluded to.

V, is the scroll cam which is firmly attached to the shaft (M) and as its name implies it is a gradually increasing cam from the center of said shaft.

W, is the drill stock the end of which is kept continually against said cam by the before mentioned spring (D) so that the cam in its action impinges against the end of said drill stock and moves the drill gradually to its work. The said vertical shaft (K) has its lower bearing in a stationary box—the bridge-tree (X) shown in dotted lines—but its upper bearing is in a lever (N) which is fulcrumed on the stationary stanchion (O) and its long arm passes through a metal staple or check (P) attached to the stationary frame (Q) and is convenient to the operator or hand attending the machine. Arranged under the frame (Q) is a spring (R) and a trigger (S) the end of the trigger passing through a slot in said frame forming a projection against which said lever rests when in the position represented in drawing.

Attached to the long arm of said lever and said stationary frame is a helical spring (Z) which pulls the lever to the limit of the staple or check (P) when released by the trigger (S) as presently described. Adjustable on the cam shaft (M) is cam (A') which is adjustable by a set screw (B') to any position on said shaft, and said shaft is also proivded with recoil spring (C') which causes the said shaft and cam (A') and cam (V) to recoil at a time and for the purpose presently mentioned. The drawing represents the lever (N) as confined by the trigger (S) in which position, it supporting the upper bearing of the vertical shaft (K), said vertical shaft is thrown into gear with the cam shaft (M), and a rotary movement will be communicated to said shaft (M) causing it to move the drill forward, by the action of the scroll cam. Now to govern the action of the drill, is, to set the machine so that the said cam shaft will be thrown out of gear and the drilling suspended at any point or position that may be required by the machine itself or without personal attention. This is readily accomplished by the machinery described as follows. We will suppose the cam shaft (M) thrown out of gear but the drill still in rotary motion, and we wish to drill in metal or other substance a hole or a series of holes of a certain depth. To do this it is only necessary to adjust the cam A' upon the shaft (M) in such a position (which position can be readily ascertained by having a scale or index upon said shaft or by other well known means) as that it shall act upon the end of the spring (R)—at the proper time—moving the trigger (S) releasing the lever (N) and throwing said cam shaft out of gear— suspending the horizontal movement of the drill stock the action of the drill in drilling—and also recoiling the cam-shaft by the action of the spring (C') causing it to assume a position to commence action upon the end of the drill stock again.

By reference to the drawings and the references herein given the operation construction and advantages of our machine will be readily understood without further description and we will now state what we claim as new and desire to secure by Letters Patent.

What we claim as our invention and desire to secure by Letters Patent is—

The use of the lever N, vertical shaft K, spring and trigger R and S, spring Z, and cam A', by which the action of the drill in drilling is regulated or governed in its depth—arranged and operating substantially as in the manner and for the purpose set forth.

In testimony whereof we have hereunto signed our names in the presence of two subscribing witnesses.

JAMES CONNER.
THOMAS NEWBY.

Witnesses:
   JOHN FINLEY,
   BENJ. H. VAN ZANT.